May 24, 1932. H. W. CLARK 1,860,316
SHEARS
Filed Dec. 27, 1929
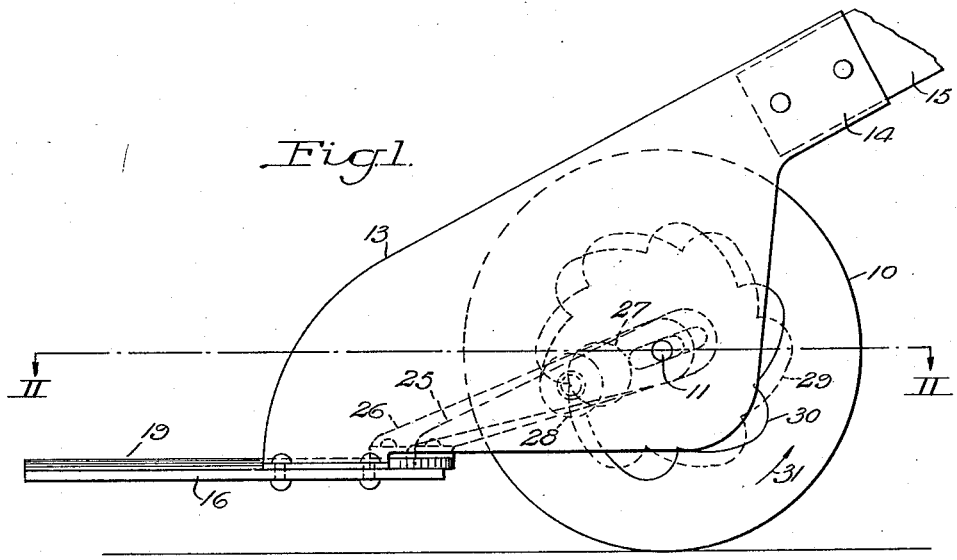
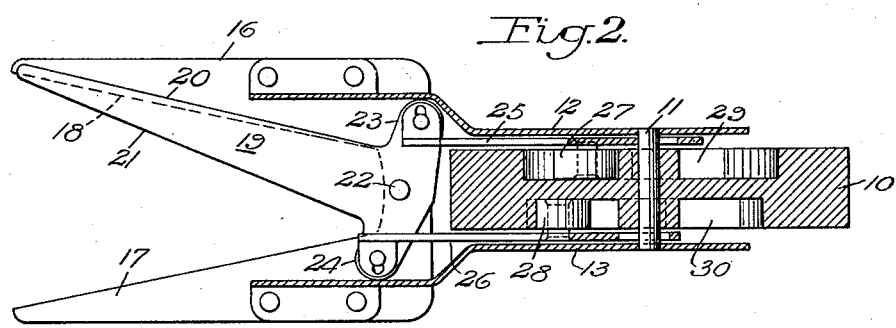
INVENTOR
Harold W. Clark
by his attorneys
Byrnes, Stebbins, Parmelee & Blenko Patented May 24, 1932

1,860,316

UNITED STATES PATENT OFFICE

HAROLD W. CLARK, OF ALLIANCE, OHIO, ASSIGNOR TO THE ALLIANCE MANUFACTURING COMPANY, OF ALLIANCE, OHIO, A CORPORATION OF OHIO

SHEARS

Application filed December 27, 1929. Serial No. 416,775.

My invention relates to shears and, in particular, to shears for cutting grass in places which are inaccessible to the ordinary type of mower.

Numerous types of grass shears have heretofore been proposed but certain disadvantages have been met with in the use of known types. One such disadvantage is that the blades of known types of shears are not so arranged that their cutting edges cooperate properly on movement of the blades. Another is that movement of the blades is not positive but is somewhat erratic. Previous types of shears have also been characterized by complexity of the operating parts and, therefore, have required frequent repair and adjustment.

I overcome the foregoing disadvantages by providing a shear which is light in weight and has few moving parts connected by a simple mechanism. This mechanism effects a positive movement of the shear blade to the cutting position and likewise causes the blade to return to its normal position. The blades are so arranged that their cutting edges always cooperate properly upon relative movement thereof.

According to the invention, I provide a stationary blade adapted to cooperate with a movable blade. The blades are supported from a frame which also carries a wheel. The wheel supports the shear and enables it to be readily moved along the ground. The wheel is provided with cam grooves and cooperating rollers are mounted on links which are connected to the moving blade. Movement of the shear along the ground thus causes the rotation of the wheel and the reciprocation of the connecting links due to the action of the cam grooves so that the moving blade is thereby oscillated. I provide grooves in both sides of the supporting wheel and displace the grooves relative to one another so that while one link is effective to oscillate the blade in one direction, the other causes a reversal of the blade movement to return it to its opposed position.

For a complete understanding of my invention, reference is made to the accompanying drawings illustrating a present preferred embodiment of the invention.

In the drawings,

Fig. 1 is a side elevation, and

Fig. 2 is a section along the line II—II of Fig. 1.

Referring in detail to the drawings, a wheel 10 rotates on a shaft 11, journalled in a frame consisting of side members 12 and 13. The upper ends of the side members form a socket 14 for receiving the end of an operating handle 15. A stationary shear blade 16 of substantially V-shape having cutting edges 17 and 18 is riveted to the side members 12 and 13. A moving blade 19 having cutting edges 20 and 21 adapted to cooperate respectively with the cutting edges 18 and 17 of the stationary shear blade 16, is pivotally supported on the blade 16 as by a rivet 22.

The fixed end of the blade 19 is provided with lateral projections 23 and 24 to which reciprocating links 25 and 26 are pivoted. The links 25 and 26 are guided in their reciprocation by the shaft 11, the links having slots near their ends through which the shaft passes.

The links 25 and 26 are reciprocated by means of rollers 27 and 28 rotatably secured thereto. The rollers 27 and 28 ride in cam grooves 29 and 30 formed on opposite faces of the wheel 10. The outline of the cam grooves may be observed in Fig. 1 which also shows that the grooves are displaced from each other circumferentially of the wheel so that, when the link 25 is withdrawn, for example, the link 26 will be extended to actuate the blade 19 to the position shown in Fig. 2.

The shear may be operated by placing the wheel 10 on the ground and pushing the shear in the direction of the material which it is desired to cut. As the shear advances the wheel 10 is turned in the direction of the arrow 31 and the rollers 27 and 28 are reciprocated alternately to shift the links 25 and 26 back and forth whereby the blade 19 is oscillated. The movement of the blade 19 causes alternate engagement of the cutting edges 18—20 and 17—21 whereby the grass between the blades is sheared.

The advantages of the structure described will be obvious. In the first place, the movement of the blade 19 in both directions is the result of a positive driving mechanism and there is no possibility that the blade will fail to return to its open position. The shear is of small size and light weight so that it may be readily handled and can be employed even in very close quarters. The moving blade has a bearing of substantial area on the fixed or stationary blade so that the tendency of the blades to depart from cutting alignment is reduced to minimum. The simplicity of the operating mechanism is such that it requires no adjustment and, because of the few moving parts and the slight wear thereof, the device has a long useful life.

Although I have disclosed a single embodiment of the invention, I do not intend to be limited to the specific details thereof since the invention may obviously be practiced in a variety of forms other than that shown. For this reason, any changes which do not depart from the spirit of the invention may be made within the scope of the following claims.

I claim:

1. A shear comprising a frame, a stationary blade secured thereto, a movable blade pivoted on said stationary blade, a shaft in said frame, a wheel journaled thereon, having cam recesses on its opposite sides, links connected to said movable blade having slots traversed by said shaft, and rollers substantially at the middle of said links engaging said recesses for oscillating said movable blade.

2. A shear comprising a frame, a stationary blade secured thereto, a movable blade pivoted on said stationary blade, a shaft in said frame, a wheel journaled thereon, having cam recesses on its opposite sides, unitary straight links pivoted to said movable blade and slidably engaging said shaft for substantially longitudinal reciprocation, and rollers on said links engaging said cam recesses for oscillating said movable blade.

In testimony whereof I have hereunto set my hand.

HAROLD W. CLARK.